(12) United States Patent
Margineantu et al.

(10) Patent No.: US 12,361,318 B2
(45) Date of Patent: Jul. 15, 2025

(54) COMPUTING PLATFORM TO ARCHITECT A MACHINE LEARNING PIPELINE

(71) Applicant: The Boeing Company, Chicago, IL (US)

(72) Inventors: Dragos D. Margineantu, Bellevue, WA (US); Seema Chopra, Bengaluru (IN); Sarada P. Mohapatra, Bengaluru (IN); Akshata Kishore Moharir, Bengaluru (IN)

(73) Assignee: The Boeing Company, Arlington, VA (US)

( * ) Notice: Subject to any disclaimer, the term of this patent is extended or adjusted under 35 U.S.C. 154(b) by 1035 days.

(21) Appl. No.: 17/376,993

(22) Filed: Jul. 15, 2021

(65) Prior Publication Data

US 2022/0121988 A1    Apr. 21, 2022

Related U.S. Application Data

(60) Provisional application No. 63/092,023, filed on Oct. 15, 2020.

(51) Int. Cl.
*G06N 20/00* (2019.01)
*G06F 3/0486* (2013.01)
*G06F 8/34* (2018.01)

(52) U.S. Cl.
CPC ........... *G06N 20/00* (2019.01); *G06F 3/0486* (2013.01); *G06F 8/34* (2013.01)

(58) Field of Classification Search
CPC .......... G06F 3/0486; G06F 8/34; G06N 20/00
See application file for complete search history.

(56) References Cited

U.S. PATENT DOCUMENTS 11,200,539 B2 * 12/2021 Iyer .................... G06Q 10/0633
11,551,151 B2 *  1/2023 Saha ...................... G06N 20/00
(Continued)

OTHER PUBLICATIONS

Apache NiFi User Guide, Apache NiFi Team. Feb. 16, 2019. 176 pages. Retrieved from the Internet <URL: https://nifi.apache.org/docs/nifi-docs/html/user-guide.html>.
(Continued)

*Primary Examiner* — Tadesse Hailu
(74) *Attorney, Agent, or Firm* — Alleman Hall & Tuttle LLP

(57) ABSTRACT

A method of architecting machine learning pipelines is provided. Example implementations of the method include causing an apparatus to generate a graphical user interface (GUI) from which a computing platform is accessible to architect machine learning pipelines. In example implementations, the method includes for a machine learning pipeline for a phase in the machine learning lifecycle: building software components that are separate, distinct and encapsulate respective processes executable to implement the phase in the machine learning lifecycle, the software components including ports that are communication endpoints of the software components. The method further includes interconnecting the software components with connections attached to the ports and thereby forming a network of interconnected software components that embodies the machine learning pipeline. The method also includes executing the machine learning pipeline and thereby the network of interconnected software components, and thereby implementing the phase in the machine learning lifecycle.

20 Claims, 6 Drawing Sheets

(56) References Cited

U.S. PATENT DOCUMENTS

| | | | | |
|---|---|---|---|---|
| 11,599,549 | B2* | 3/2023 | Sriharsha | G06F 16/901 |
| 11,599,813 | B1* | 3/2023 | Yuan | G06N 20/00 |
| 11,620,582 | B2* | 4/2023 | Chen | G06N 20/20 |
| | | | | 706/12 |
| 11,625,632 | B2* | 4/2023 | Kishimoto | G06F 18/285 |
| | | | | 706/12 |
| 11,687,536 | B2* | 6/2023 | Sharma | G06F 16/24575 |
| | | | | 707/722 |
| 11,688,111 | B2* | 6/2023 | Wang | G06F 3/0481 |
| | | | | 715/711 |
| 11,710,076 | B2* | 7/2023 | Kirsche | G06N 3/088 |
| | | | | 706/11 |
| 11,861,469 | B2* | 1/2024 | Kirchner | G06F 8/76 |
| 11,989,627 | B1* | 5/2024 | Bhise | G06F 18/2113 |
| 12,045,585 | B2* | 7/2024 | Guo | G06N 3/045 |
| 2017/0017903 | A1* | 1/2017 | Gray | G06T 11/60 |
| 2018/0322386 | A1* | 11/2018 | Sridharan | G06F 9/54 |
| 2020/0151617 | A1* | 5/2020 | Chauhan | H04L 67/535 |
| 2020/0348912 | A1* | 11/2020 | Katzenberger | G06F 9/5022 |
| 2021/0055915 | A1* | 2/2021 | Guo | G06N 3/105 |
| 2021/0109764 | A1* | 4/2021 | Thon | G06F 9/4411 |
| 2021/0264311 | A1* | 8/2021 | Mukherjee | G06N 20/20 |
| 2021/0326736 | A1* | 10/2021 | Kishimoto | G06F 18/217 |
| 2021/0390258 | A1* | 12/2021 | Turcato | G06F 40/211 |
| 2022/0019936 | A1* | 1/2022 | Sarda | G06N 20/00 |

OTHER PUBLICATIONS

What are Azure Machine Learning pipelines? What are ML pipelines, Azure Machine Learning, Microsoft Docs. Feb. 12, 2020. 13 pages. Retrieved from the Internet <URL: https://docs.microsoft.com/en-us/azure/machine-learning/concept-ml-pipelines>.

\* cited by examiner

COMPUTING PLATFORM TO ARCHITECT A MACHINE LEARNING PIPELINE

CROSS-REFERENCE TO RELATED APPLICATION(S)

This application claims priority to U.S. Provisional Application No. 63/092,023, filed Oct. 15, 2020, entitled A COMPUTING PLATFORM TO ARCHITECT A MACHINE LEARNING PIPELINE, the content of which is incorporated herein by reference in its entirety.

TECHNOLOGICAL FIELD

The present disclosure relates generally to machine learning and, in particular, to the use of computing platforms to architect and implement machine learning pipelines.

BACKGROUND

Systems implementing and reflecting machine learning protocols and algorithms have become important tools in many situations where large volumes of disparate data are captured and processed to improve the development, design, and deployment of multiple different technologies. In particular, machine learning systems are often instrumental in helping engineers, scientists, and others develop, test, and improve new and existing products.

Like other types of tools, the efficacy of machine learning tools is strongly influenced by the underlying characteristics of the machine learning tools themselves. In many situations, the accurate implementation of machine learning algorithms requires a set of skills and expertise that is not readily available to many people whose skills and expertise are focused in other areas. This raises technical challenges that can increase the time necessary to build a machine learning application and increases the likelihood that a given machine learning tool will reflect a less-optimal machine learning algorithm. Such technical challenges are often compounded in situations where a machine learning tool is intended to be used in complex development and manufacturing operations where multiple teams and other actors may interact with the machine learning tool.

Therefore it would be desirable to have a system and method that takes into account at least some of the issues discussed above, as well as other possible issues.

BRIEF SUMMARY

Example implementations of the present disclosure are directed to machine learning and, in particular, to the use of computing platforms to architect and implement machine learning pipelines. In order to overcome technical challenges that arise in the design, development, and deployment of machine learning models that can be used across multiple teams in connection with complex design, manufacturing, and maintenance operations, example implementations of the present disclosure allow users to construct machine learning algorithms by graphically linking various aspects of an application. In example implementations that involve a data integration module and a machine learning module, the data integration module is configured to receive data in multiple formats (such as XML, JSON, and other formats, for example) while the machine learning module is linked to the data integration module and may process the data through multiple types of machine learning algorithms, which can then be evaluated.

The present disclosure thus includes, without limitation, the following example implementations.

Some example implementations provide a method of architecting a machine learning pipeline, the method comprising: storing in memory computer-readable program code for a computing platform to architect machine learning pipelines for respective phases in a machine learning lifecycle, the respective phases including data acquisition and preparation, feature construction and selection, model building, evaluation, and deployment; and executing the computer-readable program code, via processing circuitry configured to access the memory, to cause an apparatus to generate a graphical user interface (GUI) from which the computing platform is accessible to architect the machine learning pipelines, including for a machine learning pipeline for a phase in the machine learning lifecycle: building software components that are separate, distinct and encapsulate respective processes executable to implement the phase in the machine learning lifecycle, the software components including ports that are communication endpoints of the software components; interconnecting the software components with connections attached to the ports and thereby forming a network of interconnected software components that embodies the machine learning pipeline; and executing the machine learning pipeline and thereby the network of interconnected software components, and thereby implementing the phase in the machine learning lifecycle.

In some example implementations of the method of any preceding example implementation, or any combination of any preceding example implementations, the software components are built from black box objects, and the computer-readable program code is executed to cause the apparatus to generate the GUI including a canvas on which the black box objects are dragged, dropped and manipulated to build the software components, and on which the connections are dragged and snapped to the ports of the software components to interconnect the software components.

In some example implementations of the method of any preceding example implementation, or any combination of any preceding example implementations, the computing platform is accessible from the GUI to architect the machine learning pipeline further including storing the machine learning pipeline in persistent storage as a template that encapsulates the network of interconnected software components, and that enables reuse of the machine learning pipeline.

In some example implementations of the method of any preceding example implementation, or any combination of any preceding example implementations, the computing platform is accessible from the GUI to architect the machine learning pipeline further including at least: accessing the template and thereby the network of interconnected software components from the persistent storage; modifying the network of interconnected software components, including adding, removing or modifying one or more of the software components or the connections that interconnect the software components, and thereby forming a new network of interconnected software components that embodies a new machine learning pipeline; and executing the new machine learning pipeline and thereby the new network of interconnected software components.

In some example implementations of the method of any preceding example implementation, or any combination of any preceding example implementations, the phase is the feature construction and selection one of the phases, and wherein building the software components includes building a set of software components that encapsulate respective processes in which independent variables are selected as or transformed into a set of features for use in building a machine learning model to predict a dependent variable.

In some example implementations of the method of any preceding example implementation, or any combination of any preceding example implementations, the respective processes include application of one or more of the independent variables to a transformation to produce a feature of the set of features, the one or more of the independent variables or the transformation selected based on user input via the GUI.

In some example implementations of the method of any preceding example implementation, or any combination of any preceding example implementations, the phase is the machine learning model building one of the phases, and wherein building the software components includes building a set of software components that encapsulate respective processes in which a machine learning model is built using a machine learning algorithm, a set of features, and a training set produced from the set of features and a plurality of observations of data, the machine learning algorithm selected from a plurality of machine learning algorithms based on user input via the GUI.

In some example implementations of the method of any preceding example implementation, or any combination of any preceding example implementations, the phase is the evaluation one of the phases, and wherein building the software components includes building a set of software components that encapsulate respective processes in which a machine learning model is used to predict and thereby produce evaluative predictions of a dependent variable, and produce at least one evaluative infographic in the GUI that summarizes the evaluative predictions in a layout that reflects performance of the machine learning model.

In some example implementations of the method of any preceding example implementation, or any combination of any preceding example implementations, the phase is the evaluation one of the phases, and wherein building the software components includes building a set of software components that encapsulate respective machine learning models that are different from one another, and processes in which the respective machine learning models are used to predict and thereby produce evaluative predictions of a dependent variable, and produce at least one evaluative infographic in the GUI that summarizes the evaluative predictions in a layout that enables a comparison of the respective machine learning models.

In some example implementations of the method of any preceding example implementation, or any combination of any preceding example implementations, the computing platform is further accessible from the GUI to architect a machine learning pipeline for multiple of the respective phases in the machine learning lifecycle, including: interconnecting those of the machine learning pipelines for the multiple of the respective phases and thereby forming a network of interconnected machine learning pipelines that embodies the machine learning pipeline for the multiple of the respective phases in the machine learning lifecycle.

Some example implementations provide an apparatus for architecting a machine learning pipeline, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for architecting a machine learning pipeline, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
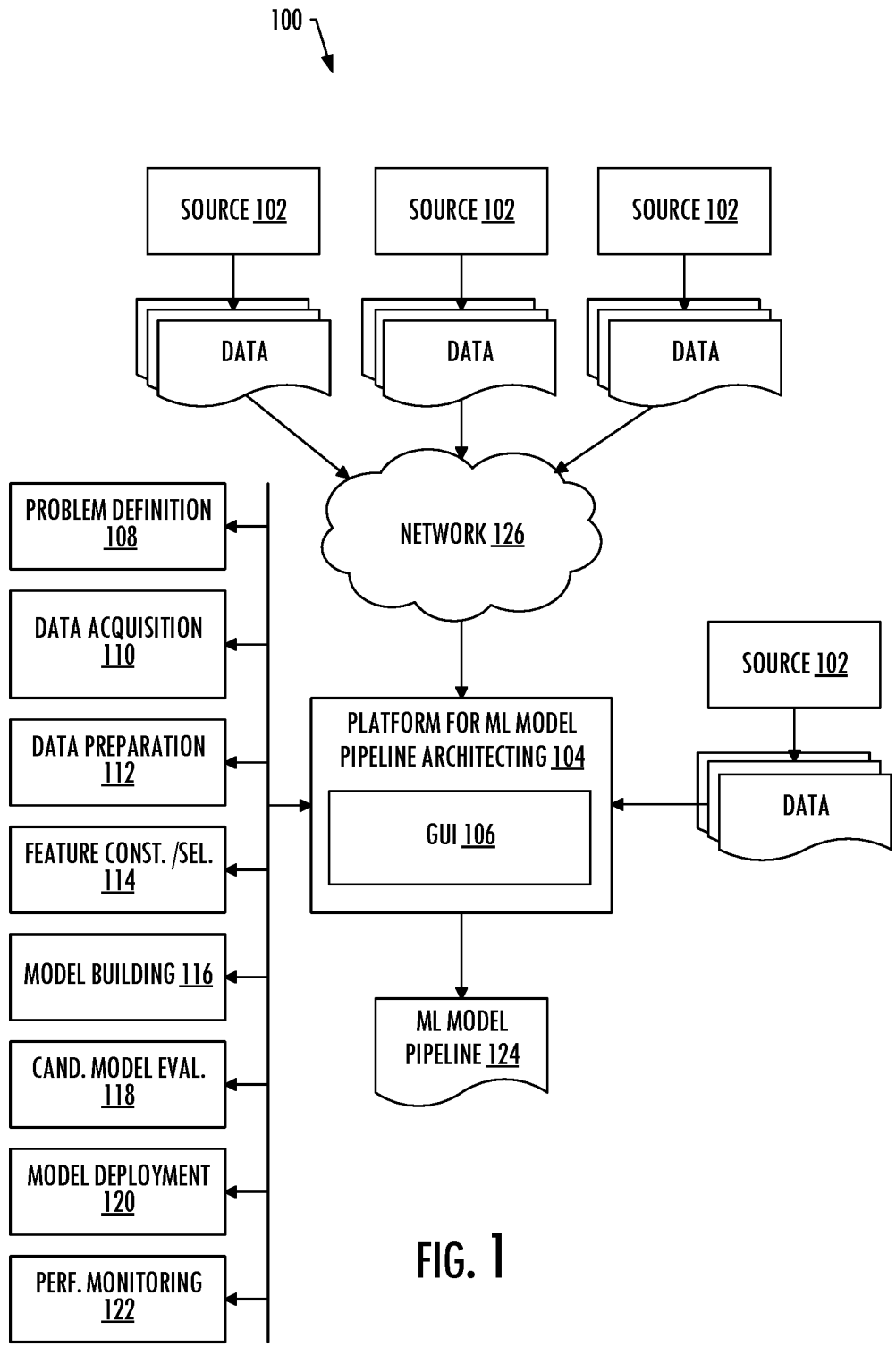
FIG. 1 illustrates a system for architecting a machine learning pipeline, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are directed to architecting a machine learning pipeline.

As used herein, a "pipeline" consists of a chain of processing elements (such as processes, threads, coroutines, functions, and the like, for example) arranged so that the output of each element is the input of the next.

Some example implementations of the present disclosure refer to a software platform, or "platform". As used here, the terms "software platform" and "platform" refer to a major piece of software, such as an operating system, an operating environment, or a database, under which various smaller application programs can be designed to run.

For example, to overcome the technical challenges associated with developing, training, deploying, and evaluating machine learning models, example implementations of the present disclosure provide a platform for data engineers, data scientists, subject matter experts, and other users to build pipelines of different machine learning tasks using graphic user interface (GUI) capabilities. In some example implementations, pre-built or template software components are provided in a defined location that can be arranged, modified, combined, and otherwise used to build one or more pipelines.

As used herein, the term "software component" refers to a software package, a web service, a web resource, or a module that encapsulates a set of related functions or data. In some example implementations, a software component may be a standalone, executable software package.

In some example implementations, the platform may be built on top of an Apache NIFI environment, which provides a set of tools allowing for the connection of different types of data stores (such as RDBMS for example), and files with a range of different file formats (such as CSV, JSON, and AVRO for example), HDFS, Casandra, HIVE, HBASE, and the like. Regardless of any software underlying the platform, some example implementations of the present disclosure provide a language agnostic development environment in which use may build software components for use in a pipeline in any relevant language, such as R, Python, JAVA, SCALA, and the like, for example.

It will be appreciated that some example implementations of the present disclosure establish a platform and development environment that that provides for the architecting of reliable, uniform, and reproducible pipelines for creating and managing large-scale training and prediction data sets. In example implementations that standardize plug-and-play workflows and tools, it is possible for multiple teams to effectively work with end-to-end machine learning workflows.

FIG. 1 illustrates a system 100 for architecting a machine learning pipeline, according to example implementations of the present disclosure. The system may include any of a number of different subsystems (each an individual system) for performing one or more functions or operations. As shown, in some examples, the system includes at least one source 102 of data, and a platform for 104 for machine learning model pipeline architecting that may implement the framework of example implementations of the present disclosure. The platform includes a graphical user interface (GUI) 106 for interacting with a problem definition module 108, a data acquisition module 110, a data preparation module 112, a feature construction and selection module 114, a model building module 116, a candidate model evaluation module 118, a model deployment module 120, and a performance monitoring module 122, with one or more of the modules being interactive through the GUI.

The subsystems including the source 102, platform 104, problem definition module 108, data acquisition module 110, data preparation module 112, feature construction and selection module 114, model building module 116, candidate model evaluation module 118, model deployment module 120, and performance monitoring module 122, may be co-located or directly coupled to one another, or in some examples, various ones of the subsystems may communicate with one another across one or more computer networks 126. Further, although shown as part of the system 100, it should be understood that any one or more of the above may function or operate as a separate system without regard to any of the other subsystems. It should also be understood that the system may include one or more additional or alternative subsystems than those shown in FIG. 1.

As described herein, a source 102 is a source of data of a system such as flight data for an aircraft recorded by an airborne flight recorder (e.g., QAR) with input from sensors or avionic systems onboard the aircraft. In some examples, the source includes a memory that may be located at a single source or distributed across multiple sources. The memory may store a plurality of observations of data, each of which includes values of a plurality of independent variables, and a value of a dependent variable. The data may be stored in a number of different manners, such as in a database or flat files of any of a number of different types or formats. In some examples in which the system is an aircraft, the observations include flight data for flights of the aircraft. For each flight, the values of the independent variables are measurements of a plurality of properties recorded by the airborne flight recorder from the sensors or avionic systems during the flight, and the value of the dependent variable is an indication of a condition of the aircraft during the flight.

The platform 104 is configured to cooperate with at least some of the problem definition module 108, data acquisition module 110, data preparation module 112, feature construction and selection module 114, model building module 116, candidate model evaluation module 118, model deployment module 120, and performance monitoring module 122, to implement the framework of example implementations of the present disclosure to develop a ML pipeline 124.

In example implementations of the present disclosure, the GUI 106 is generated from which the platform is accessible to architect one or more ML pipelines 124. For a given phase in the machine learning lifecycle of a given ML pipeline, the GUI allows for the building of software components that are separate, distinct, and encapsulate respective processes executable to implement the phase in the machine learning lifecycle, the software components including ports that are communication endpoints of the software components. The GUI also allows for the interconnecting of the software components with connections attached to the ports and thereby forming a network of interconnected software components that embodies the machine learning pipeline. The GUI or the platform may then execute the machine learning pipeline and thereby the network of interconnected software components, and thereby implement the phase in the machine learning lifecycle.

The platform 104 is configured to cooperate with the problem definition module 108, the data acquisition module 110, and the data preparation module 112 to perform one or more actions associated with an interactive exploratory data analysis of the data sources, data sets, and data values to be applied to a machine learning model to answer one or more defined questions or other analytic problems. Examples of suitable exploratory data analyses include univariate analysis, bivariate analysis, outlier detection, correlation analysis and the like.

The platform 104 is configured to cooperate with the feature construction and selection module 114 to perform an interactive feature selection (referred to herein at times as an interactive feature construction and selection) based on the interactive exploratory data analysis. In the interactive feature construction and selection, select data sets or data values are selected as or transformed into a set of features for use in building the ML pipeline 124 or a machine learning model to be produced thereby. The transformation may include application of one or more of the selected data to a transformation to produce a feature of the set of features. And in the interactive feature construction and selection, one or more of the select data selected as or transformed into the set of features, or the transformation, may be based on user input via the GUI. In this manner, a user such as a subject matter expert may build their own features based on their domain knowledge, providing user input to dictate the selection of data and/or transformation from which a feature may be produced for a machine learning model or pipeline.

As described herein, feature construction and selection may include feature selection as well as feature construction or feature generation. Feature construction and selection may incorporate techniques such as random forest, principal component analysis (PCA), information gain, correlation coefficient scoring and the like to select independent variables as features. Feature construction may include applying various functions such as addition, subtraction, cosine, tangent, sine, log, exponential or the like to one or more select independent variables to transform them into features. Feature generation may include deriving features from select independent variables using aggregating functions such as minimum, maximum, average, standard deviation, kurtosis, skewness, variance, quantile or the like. In some examples, the feature construction and selection may include a feature construction to transform select independent variables into an independent variable, as well as a feature generation to derive a feature from the independent variable.

The platform 104 is configured to cooperate with the model building module 116 to build the machine learning model using a machine learning algorithm, the set of features, and a training set. In some examples, the ML model build is interactive like the exploratory data analysis, and feature construction and selection. That is, in some examples, the platform is configured to cooperate with the model building module to perform an interactive model building. In this interactive model building, the machine learning algorithm may be selected from a plurality of machine learning algorithms based on user input via the GUI 106. Examples of suitable machine learning algorithms include supervised learning algorithms, semi-supervised learning algorithms, unsupervised learning algorithms, active learning algorithms and the like. More specific examples include random forest, decision trees, logistic regression, support vector machines and the like. For the module build, interactive or otherwise, the training set may be produced from the set of features and the plurality of observations of the data, including values of the select independent variables, and the value of the dependent variable.

The platform 104 is configured to cooperate with the candidate model evaluation module 118 to perform a model evaluation to evaluate the ML pipeline 124 and/or any models produced thereby, which may be an interactive model evaluation. This may include using the model to predict and thereby produce evaluative predictions of a dependent variable. In some examples, the evaluation may involve production of an interactive confusion matrix, class error plots, receiver operating characteristic (ROC) curves and the like. And in some examples, the interactive confusion matrix in the GUI includes a control to enable user input to increase or decrease a desired model output.

As part of the model evaluation, instead of considering only numerical errors, example implementations may also account for the risk of false predictions through an interactive confusion matrix. Depending on the situation or application setting, risk appetite of end user may differ. For example, a ML model for recommending a book may be developed in a manner similar to a ML model recommending a part repair/change in an aircraft, but they may have different costs of false prediction. The platform 104 may therefore cooperate with the candidate model evaluation module 118 to make an interactive control available to the user to increase or decrease the desired model output and get instant visual feedback of new outputs. This may be accomplished by an optimization algorithm for computational efficiency, or using any approach that involves searching for a predefined space to find best fits to objective. By giving the limits of acceptable values, the user may be again inputting their domain knowledge in development of the ML pipeline 124.

The platform 104 is configured to cooperate with the model deployment module 120 to develop one or more aspects of deployment of a machine learning model as part of the ML pipeline 124, which may be an interactive model deployment. The platform is also configured to cooperate with the performance monitoring module 122 to develop one or more aspects of the performance monitoring with respect to a deployed machine learning model as part of the ML pipeline 124. It will be appreciated that techniques, approaches, and metrics associated with the candidate model evaluation module 118 may be adapted, modified, and/or otherwise used in connection with the performance monitoring module.

In example implementations of the present disclosure, the platform 104 including its GUI 106, and various modules 108-122 may be implemented as a software-based tool for interactive development of a ML pipeline 124. According to these more particular example implementations, operation of the tool may begin with identification of a technical question or analytical problem involving aircraft data (observations of data) which can be uploaded or otherwise received into the visual environment. As explained above, this may include observations of flight data from sensors or avionic systems (generally at times simply referred to as "sensors") onboard the aircraft, recorded by an airborne flight recorder such as a QAR (the data thereby at times referred to as "QAR data"). This flight data may include independent variables that are measurements from the sensors. And the tool may enable a user such as a SME to add values of the dependent variable such as classification of the aircraft during the flights as healthy or faulty.

Figure 2:
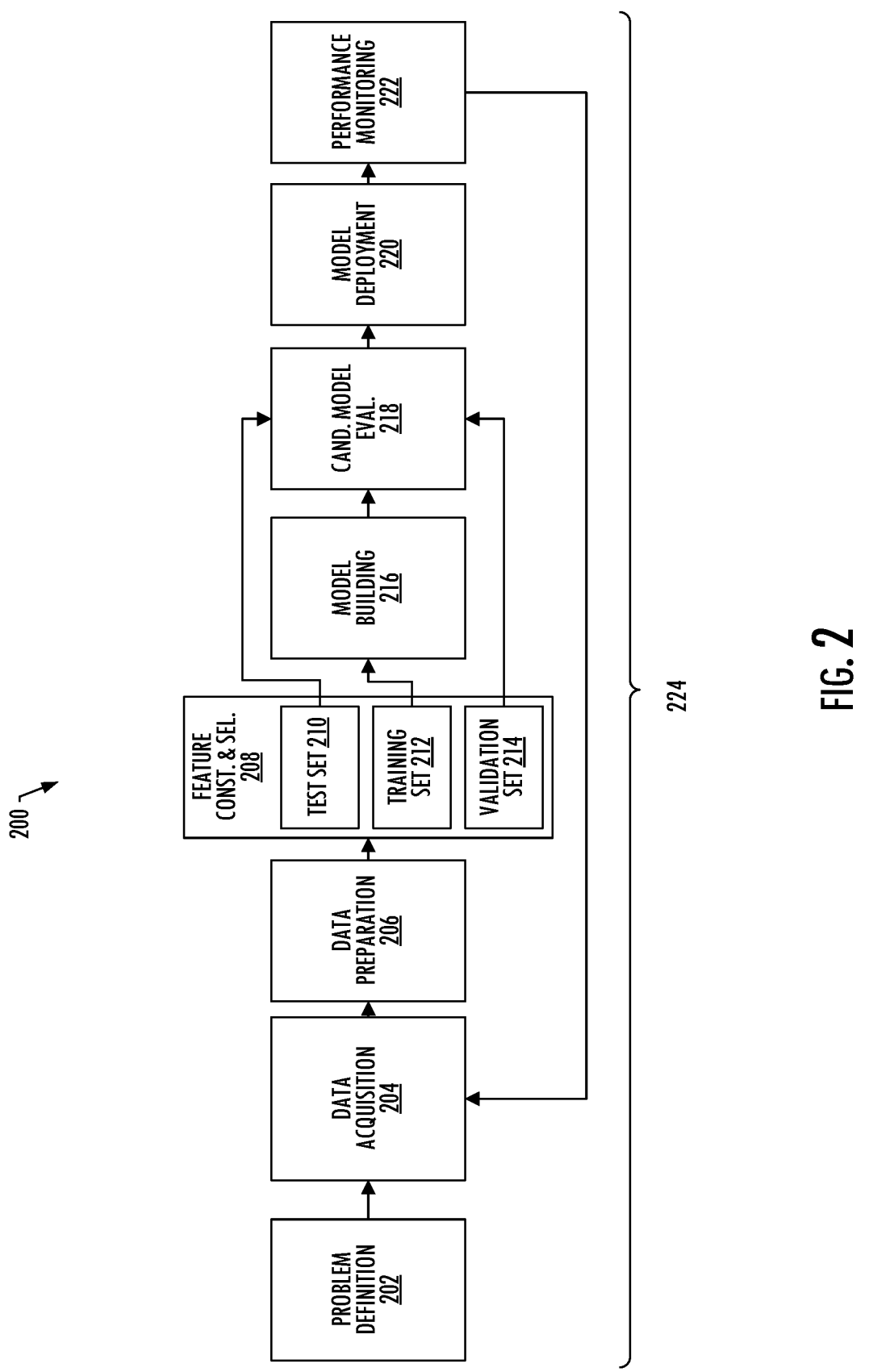
FIG. 2 is a block diagram illustrating a machine learning pipeline, according to example implementations of the present disclosure.

FIG. 2 illustrates an example machine learning pipeline 200 in accordance with example implementations of the present disclosure. The machine learning pipeline is constructed by interconnecting one or more phases associated with the design, development, deployment, evaluation, monitoring, or other aspects of a machine learning model and its lifecycle to form a network 224.

As shown in FIG. 2, the example machine learning pipeline 200 includes a plurality of phases where the output(s) of one phase serve as input(s) for one or more other phases. In the pipeline depicted in FIG. 2, the phases include a problem definition phase 202, a data acquisition phase 204, a data preparation phase 206, a feature construction and selection phase 208, a model building phase 216, a candidate model evaluation phase 218, a model deployment phase 220, and a performance monitoring phase 222.

In FIG. 2, the problem definition phase 202 is depicted as being at the beginning of the pipeline 200, with the output of the problem definition phase being passed to the data acquisition phase 204 as input. The output of the data acquisition phase which may, for example, include sets of data or identifications of sets of data to be used in connection with a given machine learning model) is passed as input to the data preparation phase 206, the output of which is passed to the feature construction and selection phase 208.

It will be appreciated that a pipeline, such as the example machine learning pipeline 200 does not require the phases to be implemented as monolithic entities. It will also be appreciated that the interconnections between phases in a given pipeline are not limited to singular, sequential, or unidirectional interconnections. As shown in FIG. 2, the pipeline 200 includes the feature construction and selection phase 208 which incorporates a plurality of data sets, shown as a test set 210, a training set 212, and a validation set 214. As shown in FIG. 2, the output from the test set and the validation set are passed to the candidate model evaluation phase 218, and the output form the training set is passed to the model building phase 216.

As shown in FIG. 2, the interconnection between the model building phase 216 and the candidate model evaluation phase 218 is shown as being bidirectional. As noted herein, the interconnections between various phases need not be unidirectional, and multi-directional interconnections, feedback loops, and other relationships between phases can be reflected in a given pipeline.

As shown in FIG. 2, the example machine learning pipeline 200 also includes the model deployment phase 220, which receives the output of the candidate model evaluation phase as input, and the performance monitoring phase 222, which receives as input the output from the model deployment phase, and in turn passes its own output to the data acquisition phase 204.

Figure 3:
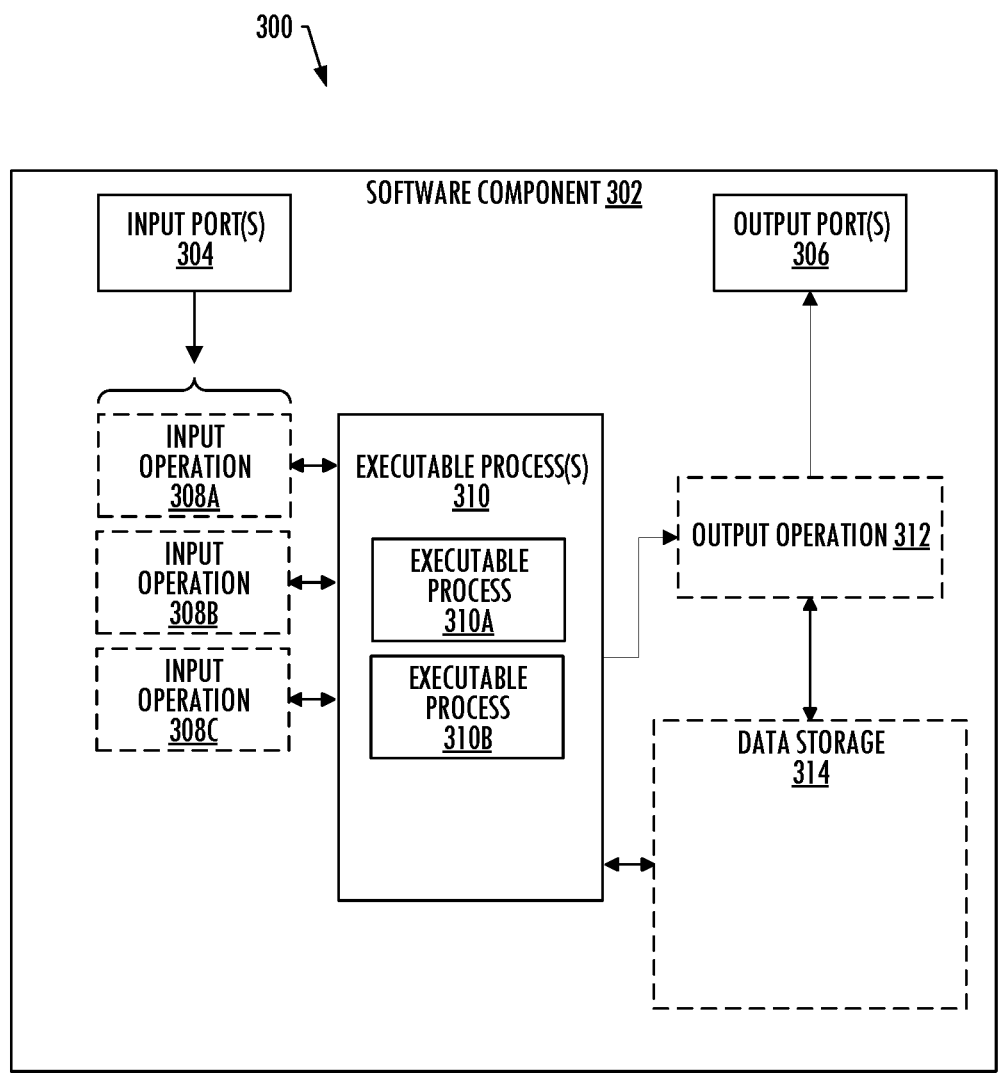
FIG. 3 is a block diagram illustrating a software component, according to example implementations of the present disclosure.

FIG. 3 presents a block diagram 300 of an example software component 302. As shown in FIG. 3, a software component includes one or more input ports 304, one or more output ports 306, and a set of executable processes 310, shown in FIG. 3 as executable processes 310A and 310B. In some example implementations, a software component may incorporate one or more input operations such as input operation 308A, input operation 308B, and/or input operation 308C, which may be involved with parsing or otherwise performing one or more tasks on the input received via an input port and routing the parsed input to the relevant executable process.

As shown in FIG. 3, the executable processes 310 of a software component 302 may interact with a data storage 314 of the software component. The software component may also include one or more output operations 312 which may be involved with performing one or more tasks associated with presenting information at the output port 306.

In some example implementations of the present disclosure, the various phases in a machine learning pipeline, such as machine learning pipeline 200, for example, may incorporate one or more software components, such as software component 302. In some such example implementations, the software components are separate, distinct, and encapsulate respective processes that are executable to implement the phase in the machine learning lifecycle, and the software components include ports that are communication endpoints of the software components.

In some example implementations, the software components 302 of a given phase are built from black box objects, and the platform 104 generates the GUI 106 including a canvas on which the black box objects are dragged, dropped, and manipulated to build the software components, and one which the connections are dragged and snapped to the ports of the software components to interconnect the software components.

Figure 4:
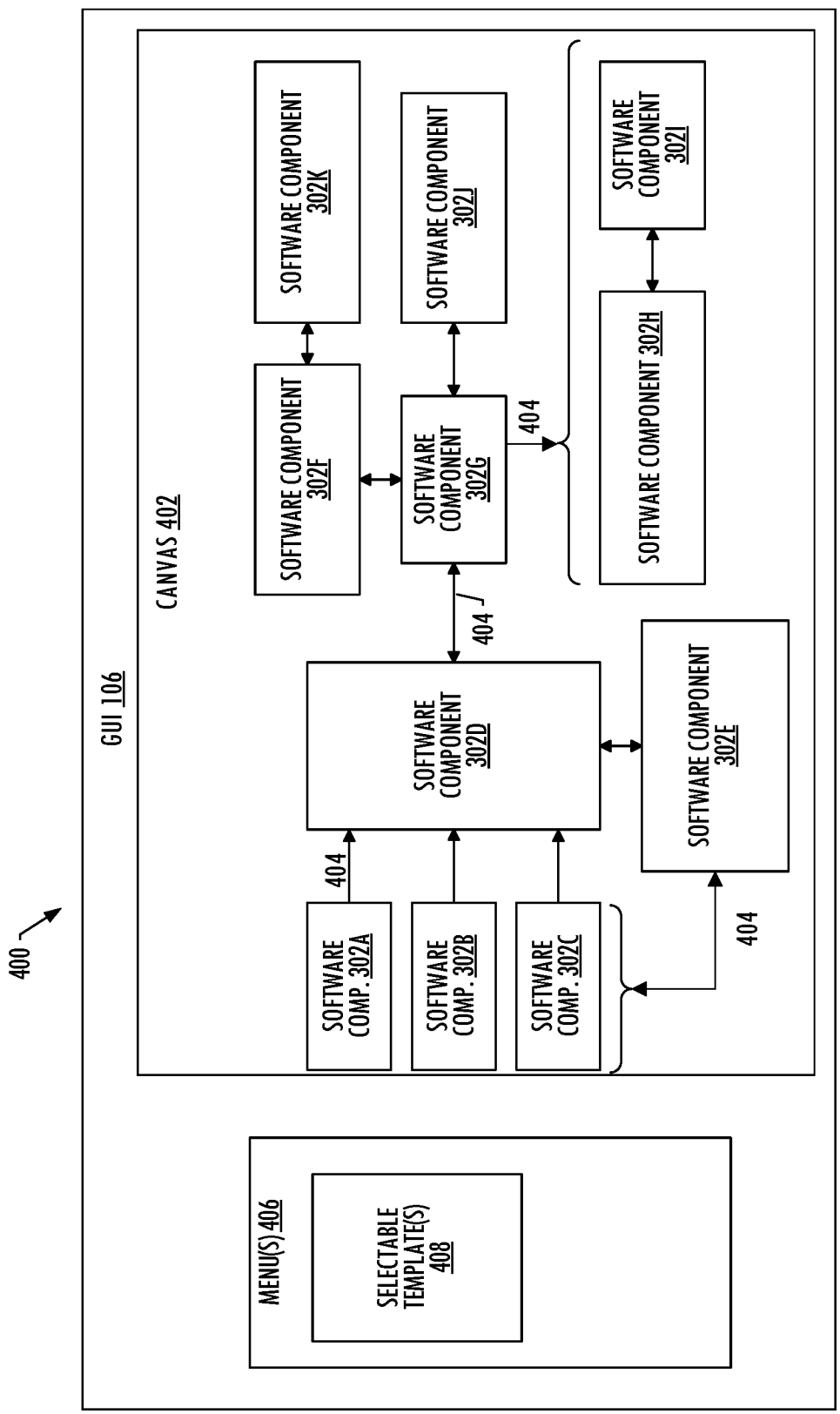
FIG. 4 illustrates an example graphical user interface, according to example implementations of the present disclosure.

FIG. 4 is a diagram 400 illustrating a GUI 106 in accordance with example implementations of the present disclosure. As shown in FIG. 4, the GUI includes a canvas 402 on which various software components 302A, 302B, 302C, 302D, 302E, 302F, 302G, 302H, 302, 302J, and 302K can be dragged, dropped, manipulated, and interconnected via one or more interconnections 404. As shown in FIG. 4, interconnections between software components may be unidirectional, bidirectional, and/or multidirectional. For example, the interconnection between software component 302A and software component 302D is unidirectional, while the interconnection between software component 302D and software component 302G is bi-directional. As shown in the multi-directional interconnection between software component 302E and software components 302A, 302B, and 302C allows from the flow of output from software component 302E to be passed to each of software components 302A, 302B, and 302C, and allows output from each of software components 302A, 302B, and 302C to be passed to software component 302E. As also shown in FIG. 4, the multi-directional interconnection between software component 302G and software components 302H and 302I allows for output from software component 302G to be passed to both software component software components 302H and 302I.

As shown in FIG. 4, the GUI 106 may also include one or more menus 406 that provide one or more selectable templates 408 that a user may select, drag, drop, modify, and interconnect to create the various software components 302 and interconnections 404 in the canvas 402 of the GUI.

Figure 5:
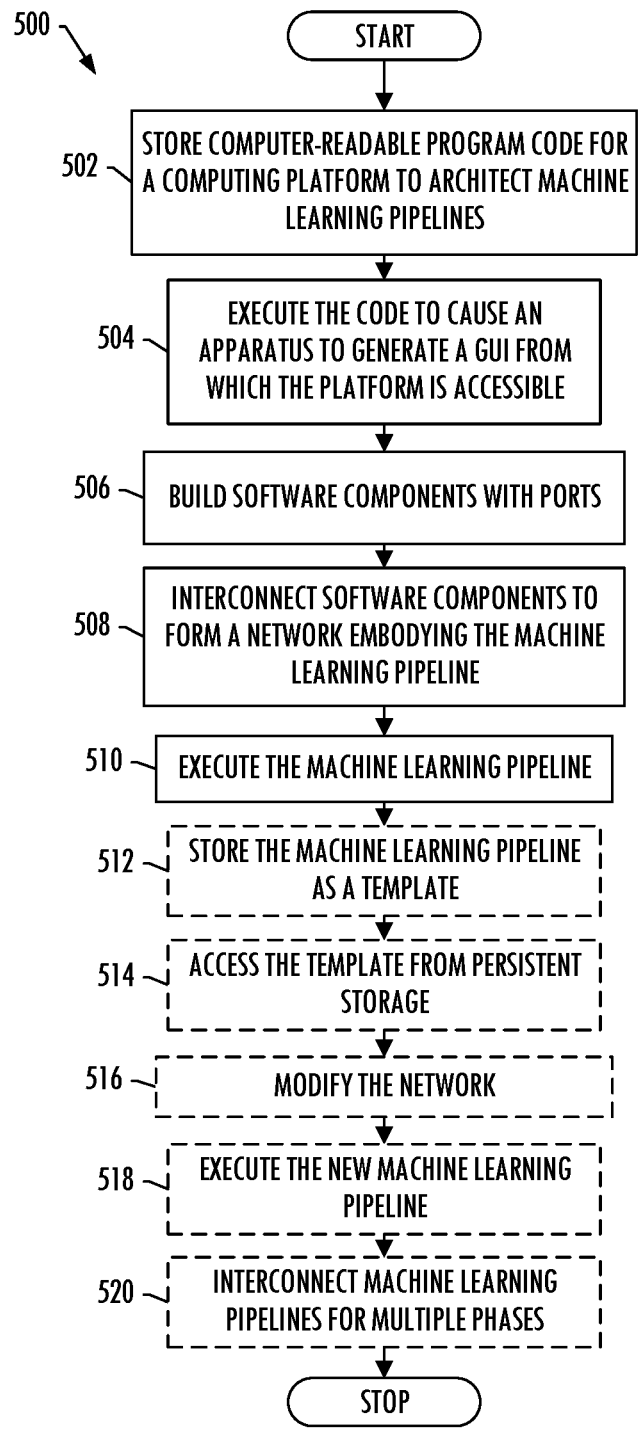
FIG. 5 is a flowchart illustrating various steps in a method of architecting a machine learning pipeline, according to example implementations.

FIG. 5 is a flowchart illustrating various steps in a method 500 of architecting a machine learning pipeline, according to example implementations of the present disclosure. As shown at block 502, the method includes storing computer-readable program code for a computing platform to architect machine learning pipelines. Some example implementations of block 502 involve storing in memory computer-readable program code for a computing platform to architect machine learning pipelines for respective phases in a machine learning lifecycle, the respective phases including data acquisition and preparation, feature construction and selection, model building, evaluation, and deployment.

As shown at block 504, the method 500 includes executing the code to cause an apparatus to generate a GUI from which the computing platform is accessible. Some example implementations of block 504 involve executing the computer-readable program code, via processing circuitry configured to access the memory, to cause an apparatus to generate a graphical user interface (GUI) from which the computing platform is accessible to architect the machine learning pipelines. Implementations of block 504 involve, for a machine learning pipeline for a phase in the machine learning lifecycle, at least the additional aspects shown in FIG. 5 as blocks 506, 508, and 510.

As shown at block 506, the method 500 includes for the machine learning pipeline for the phase in the machine learning lifecycle, building software components with ports. Some example implementations of block 506 involve building software components that are separate, distinct and encapsulate respective processes executable to implement the phase in the machine learning lifecycle, the software components including ports that are communication endpoints of the software components.

In some example implementations of block 506, the software components are built from black box objects. In such example implementations, the computer-readable program code is executed to cause the apparatus to generate the GUI including a canvas on which the black box objects are dragged, dropped and manipulated to build the software components, and on which the connections are dragged and snapped to the ports of the software components to interconnect the software components.

In some example implementations of block 506, the phase is the feature construction and selection one of the phases. In such example implementations, building the software components includes building a set of software components that encapsulate respective processes in which independent variables are selected as or transformed into a set of features for use in building a machine learning model to predict a dependent variable. In some such example implementations of block 506, the respective processes include application of one or more of the independent variables to a transformation to produce a feature of the set of features, the one or more independent variables or the transformation selected based on user input via the GUI.

In some example implementations of block 506, the phase is the machine learning building one of the phases. In such example implementations, building the software components includes building a set of software components that encapsulate respective processes in which a machine learning model is built using a machine learning algorithm, a set of features, and a training set produced from the set of features and a plurality of observations of data, the machine learning algorithm selected from a plurality of machine learning algorithms based on user input via the GUI.

In some example implementations of block 506, the phase is the evaluation one of the phases. In such example implementations, building the software components includes building a set of software components that encapsulate respective processes in which a machine learning model is used to predict and thereby produce evaluative predictions of a dependent variable, and produce at least one evaluative infographic in the GUI that summarizes the evaluative predictions in a layout that reflects performance of the machine learning model.

In some example implementations of block 506, the phase is the evaluation one of the phases. In such example implementations, building the software components includes building a set of software components that encapsulate respective machine learning models that are different from one another, and processing in which the respective machine learning models are used to predict and thereby produce evaluative predictions of a dependent variable, and produce at least one evaluative infographic in the GUI that summarizes the evaluative predictions in a layout that enables a comparison of the respective machine learning models.

As shown at block 508, the method 500 includes for the machine learning pipeline for the phase in the machine learning lifecycle, interconnecting software components to form a network embodying the machine learning pipeline. Some example implementations of block 508 involve interconnecting the software components with connections attached to the ports and thereby forming a network of interconnected software components that embodies the machine learning pipeline.

As shown at block 510, the method 500 includes for the machine learning pipeline for the phase in the machine learning lifecycle, executing the machine learning pipeline. Some example implementations of block 510 involve executing the machine learning pipeline and thereby the network of interconnected software components, and thereby implementing the phase in the machine learning lifecycle.

In some example implementations, the method 500 may include one or more additional aspects. As shown at block 512, the method 500 may include storing the machine learning pipeline as a template. Some example implementations of block 512 involve storing the machine learning pipeline in persistent storage as a template that encapsulates the network of interconnected software component, and that enables the reuse of the machine learning pipeline.

As shown at block 514, the method 500 may also include accessing the template from persistent storage. Some example implementations of block 514 involve accessing the template and thereby the network of interconnected software components from persistent storage. As shown at block 516, the method 500 may also include modifying the network. Some example implementations of block 516 involve modifying the network of interconnected software components, including adding, removing or modifying one or more of the software components or the connections that interconnect the software components, and thereby forming a new network of interconnected software components that embodies a new machine learning pipeline. As shown at block 518, the method 500 may also include executing the new machine learning pipeline. Some example implementations of block 518 involve executing the new machine learning pipeline and thereby the new network of interconnected software components.

As shown at block 520, the method 500 may also include interconnecting machine learning pipelines for multiple phases. Some example implementations of block 520 involve interconnecting those of the machine learning pipelines for the multiple of the respective phases in the machine learning lifecycle and thereby forming a network of interconnected machine learning pipelines that embodies the machine learning pipeline for the multiple of the respective phases in the machine learning lifecycle.

According to example implementations of the present disclosure, the system 100 and its subsystems including the platform 104 the GUI 106, and the modules 108-122 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 6:
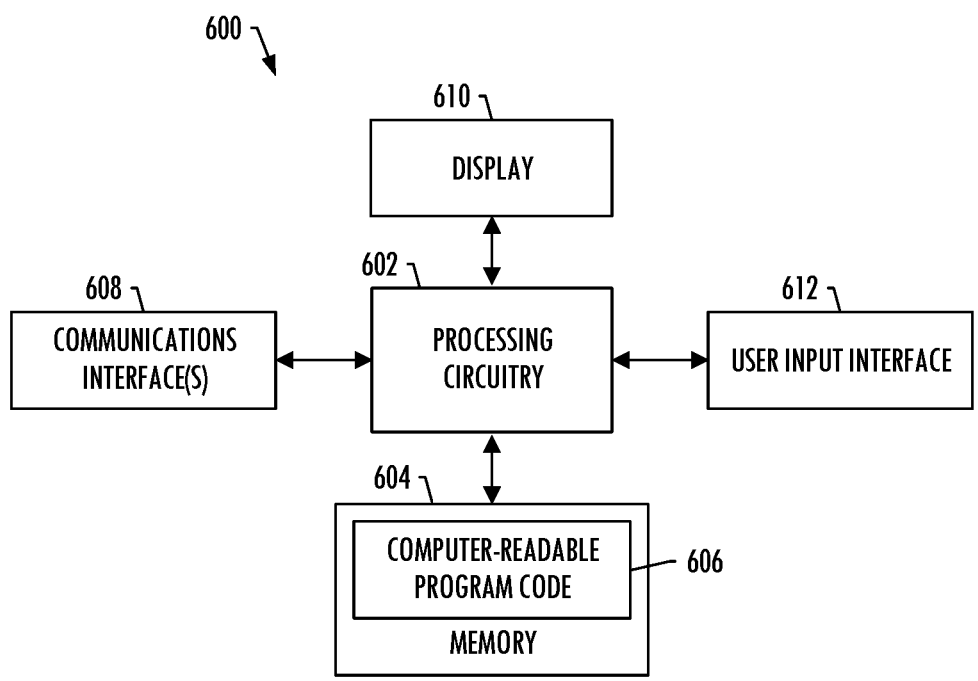
FIG. 6 illustrates an apparatus according to some example implementations.

FIG. 6 illustrates an apparatus 600 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 602 (e.g., processor unit) connected to a memory 604 (e.g., storage device).

The processing circuitry 602 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 604 (of the same or another apparatus).

The processing circuitry 602 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processing circuitry 602 may also be connected to one or more interfaces for displaying, transmitting and/or receiving information. The interfaces may include a communications interface 608 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 may include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for architecting machine learning pipelines, the apparatus comprising:
    a memory configured to store computer-readable program code for a computing platform to architect machine learning pipelines for respective phases in a machine learning lifecycle, the respective phases including data acquisition and preparation, feature construction and selection, model building, evaluation, and deployment; and
    processing circuitry configured to access the memory, and execute the computer-readable program code to cause the apparatus to at least:
    generate a graphical user interface (GUI) from which the computing platform is accessible to architect the machine learning pipelines, including for a machine learning pipeline for a phase in the machine learning lifecycle:
        build software components that are separate, distinct and encapsulate respective processes executable to implement the phase in the machine learning lifecycle, the software components including ports that are communication endpoints of the software components, wherein at least one of the software components is configured to output a set of features based on an independent variable for use in building a machine learning model to predict a dependent variable;
        interconnect the software components with connections attached to the ports and thereby form a network of interconnected software components that embodies the machine learning pipeline; and
        execute the machine learning pipeline and thereby the network of interconnected software components to implement the phase in the machine learning lifecycle.

2. The apparatus of claim 1, wherein the software components are built from black box objects, and the computer-readable program code is executed to cause the apparatus to generate the GUI including a canvas on which the black box objects are dragged, dropped and manipulated to build the software components, and on which the connections are dragged and snapped to the ports of the software components to interconnect the software components.

3. The apparatus of claim 1, wherein the computing platform is accessible from the GUI to architect the machine learning pipeline further including storing the machine learning pipeline in persistent storage as a template that encapsulates the network of interconnected software components, and that enables reuse of the machine learning pipeline.

4. The apparatus of claim 3, wherein the computing platform is accessible from the GUI to architect the machine learning pipeline further including at least:
    accessing the template and thereby the network of interconnected software components from the persistent storage;
    modifying the network of interconnected software components, including adding, removing or modifying one or more of the software components or the connections that interconnect the software components, and thereby forming a new network of interconnected software components that embodies a new machine learning pipeline; and
    executing the new machine learning pipeline and thereby the new network of interconnected software components.

5. The apparatus of claim 1, wherein the respective processes include application the independent variable to a transformation to produce a feature of the set of features, the independent variable or the transformation selected based on user input via the GUI.

6. The apparatus of claim 1, wherein the phase is the machine learning model building one of the phases, and
    wherein the apparatus being configured to build the software components includes the apparatus being further configured to build a set of software components that encapsulate respective processes in which a machine learning model is built using a machine learning algorithm, the set of features, and a training set produced from the set of features and a plurality of observations of data, the machine learning algorithm selected from a plurality of machine learning algorithms based on user input via the GUI.

7. The apparatus of claim 1, wherein the phase is the evaluation one of the phases, and
    wherein the apparatus being configured to build the software components includes the apparatus being further configured to build a set of software components that encapsulate respective processes in which a machine learning model is used to predict and thereby produce evaluative predictions of the dependent variable, and produce at least one evaluative infographic in the GUI that summarizes the evaluative predictions in a layout that reflects performance of the machine learning model.

8. The apparatus of claim 1, wherein the phase is the evaluation one of the phases, and wherein the apparatus being configured to build the software components includes the apparatus being further configured to build a set of software components that encapsulate respective machine learning models that are different from one another, and processes in which the respective machine learning models are used to predict and thereby produce evaluative predictions of the dependent variable, and produce at least one evaluative infographic in the GUI that summarizes the evaluative predictions in a layout that enables a comparison of the respective machine learning models.

9. The apparatus of claim 1, wherein the apparatus is further accessible from the GUI to architect a machine learning pipeline for multiple of the respective phases in the machine learning lifecycle, including:
   interconnecting those of the machine learning pipelines for the multiple of the respective phases and thereby forming a network of interconnected machine learning pipelines that embodies the machine learning pipeline for the multiple of the respective phases in the machine learning lifecycle.

10. The apparatus of claim 1, wherein the independent variable is measured using an on-board sensor during a flight of an aircraft.

11. A method of architecting machine learning pipelines, the method comprising:
   storing in memory computer-readable program code for a computing platform to architect machine learning pipelines for respective phases in a machine learning lifecycle, the respective phases including data acquisition and preparation, feature construction and selection, model building, evaluation, and deployment; and
   executing the computer-readable program code, via processing circuitry configured to access the memory, to cause an apparatus to generate a graphical user interface (GUI) from which the computing platform is accessible to architect the machine learning pipelines, including for a machine learning pipeline for a phase in the machine learning lifecycle:
      building software components that are separate, distinct and encapsulate respective processes executable to implement the phase in the machine learning lifecycle, the software components including ports that are communication endpoints of the software components, wherein at least one of the software components is configured to output a set of features based on an independent variable for use in building a machine learning model to predict a dependent variable;
      interconnecting the software components with connections attached to the ports and thereby forming a network of interconnected software components that embodies the machine learning pipeline; and
      executing the machine learning pipeline and thereby the network of interconnected software components, and thereby implementing the phase in the machine learning lifecycle.

12. The method of claim 11, wherein the software components are built from black box objects, and the computer-readable program code is executed to cause the apparatus to generate the GUI including a canvas on which the black box objects are dragged, dropped and manipulated to build the software components, and on which the connections are dragged and snapped to the ports of the software components to interconnect the software components.

13. The method of claim 11, wherein the computing platform is accessible from the GUI to architect the machine learning pipeline further including storing the machine learning pipeline in persistent storage as a template that encapsulates the network of interconnected software components, and that enables reuse of the machine learning pipeline.

14. The method of claim 13, wherein the computing platform is accessible from the GUI to architect the machine learning pipeline further including at least:
   accessing the template and thereby the network of interconnected software components from the persistent storage;
   modifying the network of interconnected software components, including adding, removing or modifying one or more of the software components or the connections that interconnect the software components, and thereby forming a new network of interconnected software components that embodies a new machine learning pipeline; and
   executing the new machine learning pipeline and thereby the new network of interconnected software components.

15. The method of claim 11, wherein the respective processes include application of the independent variable to a transformation to produce a feature of the set of features, the independent variable or the transformation selected based on user input via the GUI.

16. The method of claim 11, wherein the phase is the machine learning model building one of the phases, and
   wherein building the software components includes building a set of software components that encapsulate respective processes in which a machine learning model is built using a machine learning algorithm, the set of features, and a training set produced from the set of features and a plurality of observations of data, the machine learning algorithm selected from a plurality of machine learning algorithms based on user input via the GUI.

17. The method of claim 11, wherein the phase is the evaluation one of the phases, and
   wherein building the software components includes building a set of software components that encapsulate respective processes in which a machine learning model is used to predict and thereby produce evaluative predictions of the dependent variable, and produce at least one evaluative infographic in the GUI that summarizes the evaluative predictions in a layout that reflects performance of the machine learning model.

18. The method of claim 11, wherein the phase is the evaluation one of the phases, and
   wherein building the software components includes building a set of software components that encapsulate respective machine learning models that are different from one another, and processes in which the respective machine learning models are used to predict and thereby produce evaluative predictions of the dependent variable, and produce at least one evaluative infographic in the GUI that summarizes the evaluative predictions in a layout that enables a comparison of the respective machine learning models.

19. The method of claim 11, wherein the computing platform is further accessible from the GUI to architect a machine learning pipeline for multiple of the respective phases in the machine learning lifecycle, including:
   interconnecting those of the machine learning pipelines for the multiple of the respective phases and thereby forming a network of interconnected machine learning pipelines that embodies the machine learning pipeline for the multiple of the respective phases in the machine learning lifecycle.

20. The method of claim 11, wherein the independent variable is measured using an on-board sensor during a flight of an aircraft.

\* \* \* \* \*